United States Patent
Tanaka et al.

(10) Patent No.: US 8,818,657 B2
(45) Date of Patent: Aug. 26, 2014

(54) CONTINUOUSLY VARIABLE TRANSMISSION AND SHIFT CONTROL METHOD

(75) Inventors: Hiroyasu Tanaka, Atsugi (JP); Masahide Ito, Atsugi (JP); Masato Mori, Isehara (JP); Takashi Eguchi, Machida (JP); Ryousuke Nonomura, Kawasaki (JP); Seiichiro Takahashi, Isehara (JP); Mamiko Inoue, Ebina (JP)

(73) Assignee: Jatco Ltd, Fuji-shi (JP)

( * ) Notice: Subject to any disclaimer, the term of this patent is extended or adjusted under 35 U.S.C. 154(b) by 266 days.

(21) Appl. No.: 13/216,986

(22) Filed: Aug. 24, 2011

(65) Prior Publication Data

US 2012/0059556 A1    Mar. 8, 2012

(30) Foreign Application Priority Data

Sep. 8, 2010 (JP) .................. 2010-201167

(51) Int. Cl.
- *G06F 7/00* (2006.01)
- *F02C 7/36* (2006.01)
- *B60W 10/04* (2006.01)

(52) U.S. Cl.
USPC .................. 701/52; 477/31; 477/37; 903/918

(58) Field of Classification Search
CPC .................................................. F16H 61/0059
USPC ........................................................... 701/52
See application file for complete search history.

(56) References Cited

U.S. PATENT DOCUMENTS

| | | |
|---|---|---|
| 7,493,203 B2 | 2/2009 | Bitzer et al. |
| 2005/0227809 A1 | 10/2005 | Bitzer et al. |
| 2011/0015834 A1* | 1/2011 | Nonomura et al. ............. 701/51 |

FOREIGN PATENT DOCUMENTS

| | | |
|---|---|---|
| EP | 2 169 278 A1 | 3/2010 |
| EP | 2 169 279 A1 | 3/2010 |
| JP | 05-079554 A | 3/1993 |
| JP | 2002-243031 A | 8/2002 |
| JP | 2002243031 A * | 8/2002 |
| WO | WO 03/067127 A2 | 8/2003 |

* cited by examiner

*Primary Examiner* — Calvin Cheung
*Assistant Examiner* — Basil T Jos
(74) *Attorney, Agent, or Firm* — Foley & Lardner LLP

(57) ABSTRACT

The shift control unit shifts the sub-transmission mechanism while changing the speed ratio of the variator in response to a change in the speed ratio of the sub-transmission mechanism so that the through speed ratio does not change after the through speed ratio is caused to reach the final through speed ratio by changing only the speed ratio of the variator if the speed ratio corresponding to the shift instruction from the driver is between a first speed ratio at which the sub-transmission mechanism is in the second gear position at the high speed side and the speed ratio of the variator is lowest and a second speed ratio at which the sub-transmission mechanism is in the first gear position at the low speed side and the speed ratio of the variator is highest when the manual mode is selected.

12 Claims, 8 Drawing Sheets

CONTINUOUSLY VARIABLE TRANSMISSION AND SHIFT CONTROL METHOD

FIELD OF THE INVENTION

The present invention relates to a shift control in a manual mode in a continuously variable transmission including a variator and a sub-transmission mechanism.

BACKGROUND OF THE INVENTION

A continuously variable transmission is known which includes a continuously variable transmission mechanism (variator) and a sub-transmission mechanism which is selectively switched to a plurality of forward gear positions. In such a transmission, a ratio range can be enlarged by the sub-transmission mechanism as compared with a continuously variable transmission formed only by a variator. Thus, fuel economy can be improved by improving engine efficiency.

In the case of a shift accompanied by a shift of the sub-transmission mechanism in such a transmission, the variator is shifted in a direction opposite to a shifting direction of the sub-transmission mechanism when the shift of the sub-transmission mechanism is started. In this way, a change in the rotation speed of an engine is suppressed without changing a speed ratio of the entire transmission before and after the shift, wherefore a shift shock can be suppressed (JP5-79554A).

Further, a continuously variable transmission is known which has a so-called manual mode in which a speed ratio is selectively controlled through a shifting operation by a driver (JP2002-243031A).

SUMMARY OF THE INVENTION

In the case of realizing a manual mode in a conventional continuously variable transmission, shift responsiveness is required to be quicker than that during a period from the start to the end of a shift in a normal drive range in order to quickly achieve a driver's intention to shift.

On the other hand, in a shift accompanied by a shift of a sub-transmission mechanism, preparation of a hydraulic control is necessary to shift the sub-transmission mechanism, and shift responsiveness until the sub-transmission mechanism is shifted after a shift instruction is given differs from that of a variator. Thus, shift responsiveness differs between the shift only by the variator and that by the variator and the sub-transmission mechanism, whereby a sense of incongruity is given to a driver.

The present invention aims to prevent a shift in a manual mode from giving a sense of incongruity to a driver in a continuously variable transmission including a variator and a sub-transmission mechanism.

According to an aspect of the present invention, a continuously variable transmission installed in a vehicle to shift and transmit output rotation of a driving source, includes a variator which changes a speed ratio continuously, a sub-transmission mechanism provided in series with the variator and having a first gear position at a low speed side and a second gear position at a high speed side, and a shift control unit which sets a final through speed ratio as a target speed ratio based on a driving condition of the vehicle and causes a through speed ratio, which is an overall speed ratio of the variator and the sub-transmission mechanism, to follow the final through speed ratio in a specified response by changing at least one of the speed ratio of the variator and the gear position of the sub-transmission mechanism. The shift control unit is so configured as to be able to select a manual mode in which a plurality of gear positions are set beforehand and a speed ratio corresponding to any one of the plurality of gear positions is set as the final speed ratio based on a shift instruction from a driver, and shifts the sub-transmission mechanism while changing the speed ratio of the variator in response to a change in the speed ratio of the sub-transmission mechanism so that the through speed ratio does not change after the through speed ratio is caused to reach the final through speed ratio by changing only the speed ratio of the variator if the speed ratio corresponding to the shift instruction from the driver is between a first speed ratio at which the sub-transmission mechanism is in the second gear position at the high speed side and the speed ratio of the variator is lowest and a second speed ratio at which the sub-transmission mechanism is in the first gear position at the low speed side and the speed ratio of the variator is highest when the manual mode is selected.

According to another aspect of the present invention, a shift control method for a continuously variable transmission which includes a variator which changes a speed ratio continuously and a stepped sub-transmission mechanism provided in series with the variator and is installed in a vehicle to shift and transmit output rotation of a driving source, is provided. The method includes setting a final through speed ratio as a target speed ratio based on a driving condition of the vehicle, causing a through speed ratio, which is an overall speed ratio of the variator and the sub-transmission mechanism, to follow the final through speed ratio in a specified response by changing at least one of the speed ratio of the variator and the gear position of the sub-transmission mechanism, and causing the through speed ratio to follow the final through speed ratio by changing only the speed ratio of the variator if a speed ratio corresponding to a shift instruction from a driver is between a first speed ratio at which the sub-transmission mechanism is in a second gear position at a high speed side and the speed ratio of the variator is lowest and a second speed ratio at which the sub-transmission mechanism is in a first gear position at a low speed side and the speed ratio of the variator is highest when a manual mode is selected in which a plurality of gear positions are set beforehand and a speed ratio corresponding to any one of the plurality of gear positions is set as the final speed ratio based on the shift instruction from the driver, and shifting the sub-transmission mechanism thereafter while the speed ratio of the variator is changed in response to a change in the speed ratio of the sub-transmission mechanism so that the through speed ratio does not change.

Embodiments and advantages of this invention will be described in detail below with reference to the attached figures.

DESCRIPTION OF THE PREFERRED EMBODIMENTS

Hereinafter, an embodiment of the present invention is described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
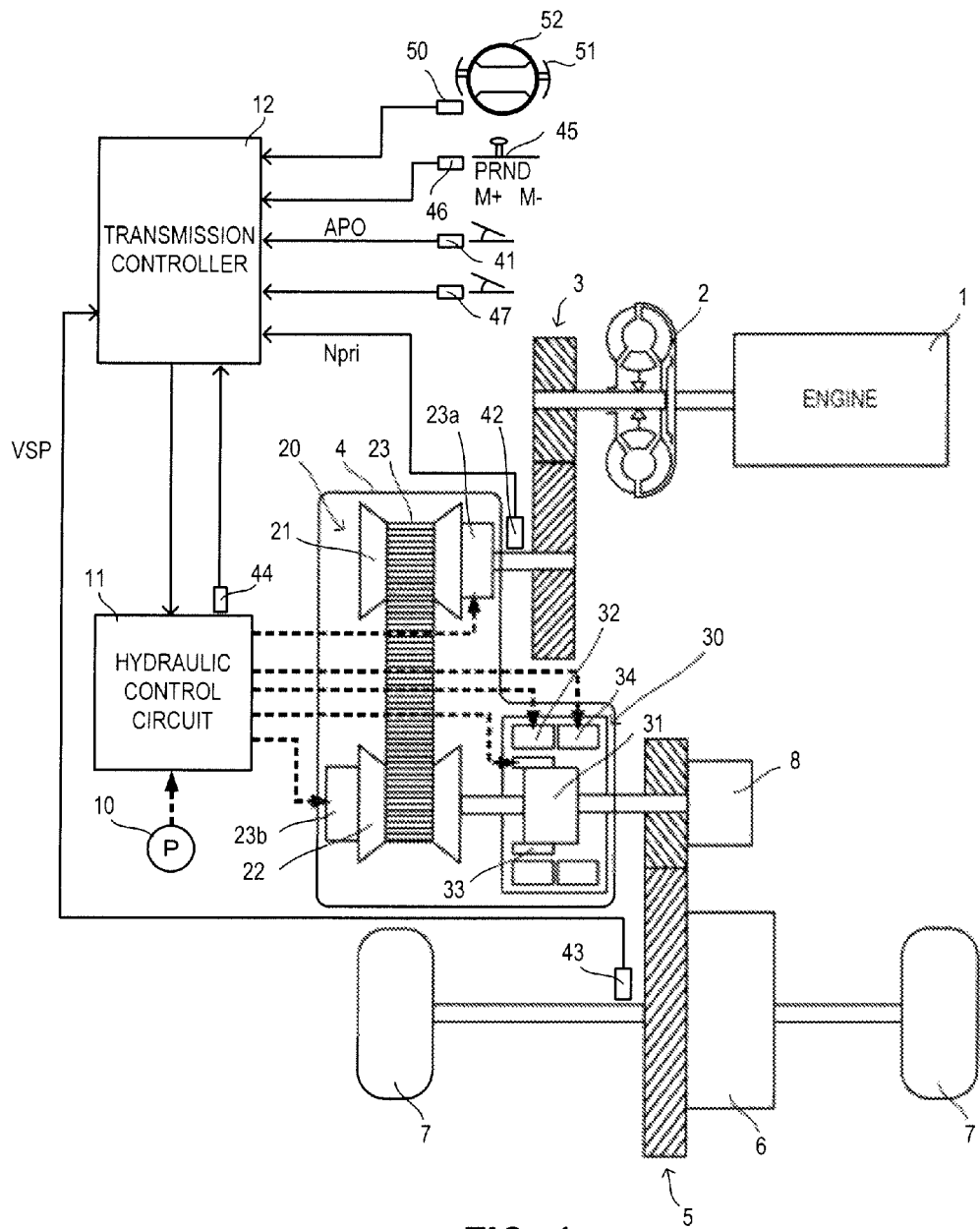
FIG. 1 is a schematic construction diagram of a vehicle including a continuously variable transmission according to an embodiment.

FIG. 1 is a schematic construction diagram of a vehicle including a continuously variable transmission according to this embodiment. The vehicle includes an engine 1 as a driving source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle is provided with an oil pump 10 which is driven using a part of power of the engine 1, a hydraulic control circuit 11 for adjusting a hydraulic pressure from the oil pump 10 and supplying the adjusted hydraulic pressure to respective components of the transmission 4 and a transmission controller 12 for controlling the hydraulic control circuit 11.

The respective constructions are described. The transmission 4 includes a continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path. The sub-transmission mechanism 30 may be directly connected to an output shaft of the variator 20 as in this example or may be connected via another transmission or power transmission mechanism (e.g. gear train).

The variator 20 is a V-belt continuously variable transmission mechanism including a primary pulley 21, a secondary pulley 22 and a V-belt 23 wrapped around the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio vRatio of the variator 20 continuously changes.

The sub-transmission mechanism 30 is a transmission mechanism with two forward speeds and one reverse speed.

The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed. For example, the sub-transmission mechanism 30 is set to a first gear position if the low brake 32 is engaged and the high clutch 33 and the reverse brake 34 are released. The transmission mechanism 30 is set to a second gear position with a speed ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
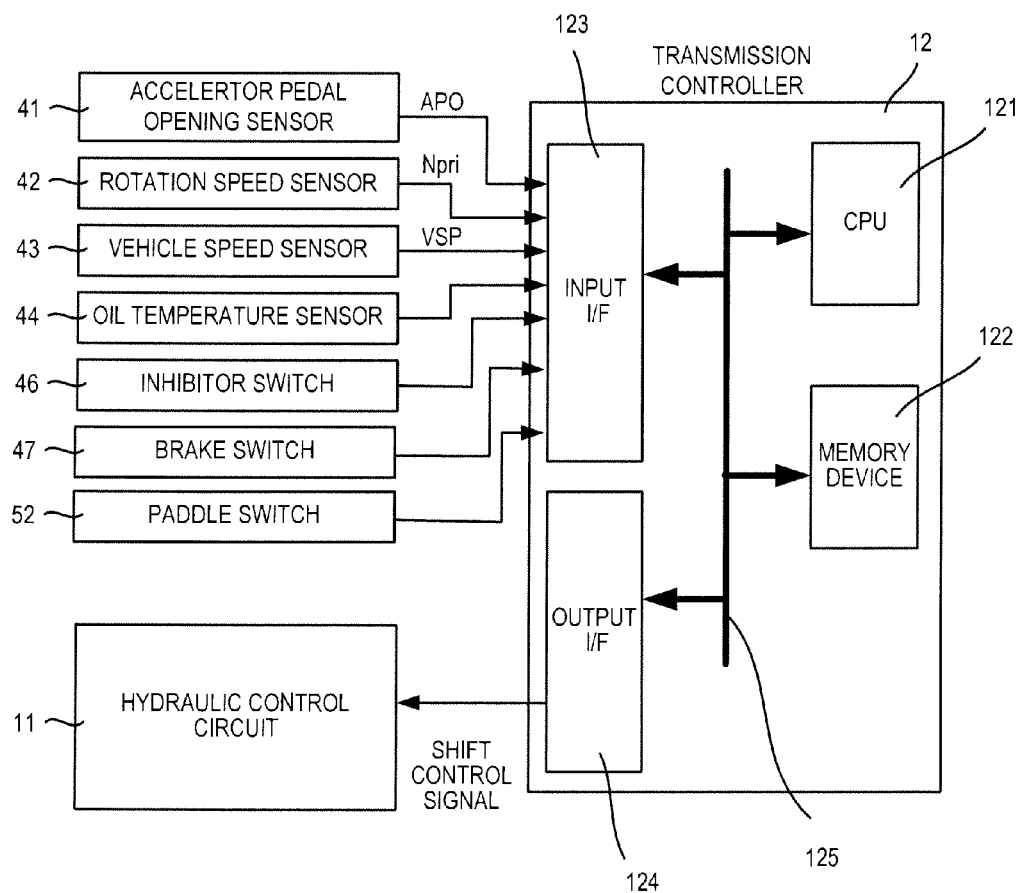
FIG. 2 is a diagram showing an exemplary construction of a transmission controller according to the embodiment of the present invention.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting the opening of an accelerator pedal (hereinafter, referred to as an "accelerator pedal opening APO"), an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a driving speed of the vehicle (hereinafter, referred to as a "vehicle speed VSP"), an output signal of an oil temperature sensor 44 for detecting the oil temperature of the transmission 4, an output signal of an inhibitor switch 46 for detecting the position of a select lever 45, an output signal of a brake switch 47 for detecting depression of a brake pedal, and like output signals. An output signal of a paddle switch 50 for detecting an operated state of a paddle 51 provided on a steering wheel 52 is also input.

A shift control program of the transmission 4 and a shift map (FIG. 3) used in this shift control program are stored in the memory device 122. The CPU 121 reads the shift control program stored in the memory device 122 and implements it, performs various computations on various signals input via the input interface 123 to generate a shift control signal, and outputs the generated shift control signal to the hydraulic control circuit 11 via the output interface 124. Various values used in the computations by the CPU 121 and computation results are appropriately stored in the memory device 122.

The hydraulic control circuit 11 includes a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced in the oil pump 10, and supplies this hydraulic pressure to the respective components of the transmission 4. In this way, the speed ratio vRatio of the variator 20 and the gear position of the sub-transmission mechanism 30 are changed to shift the transmission 4.

Figure 3:
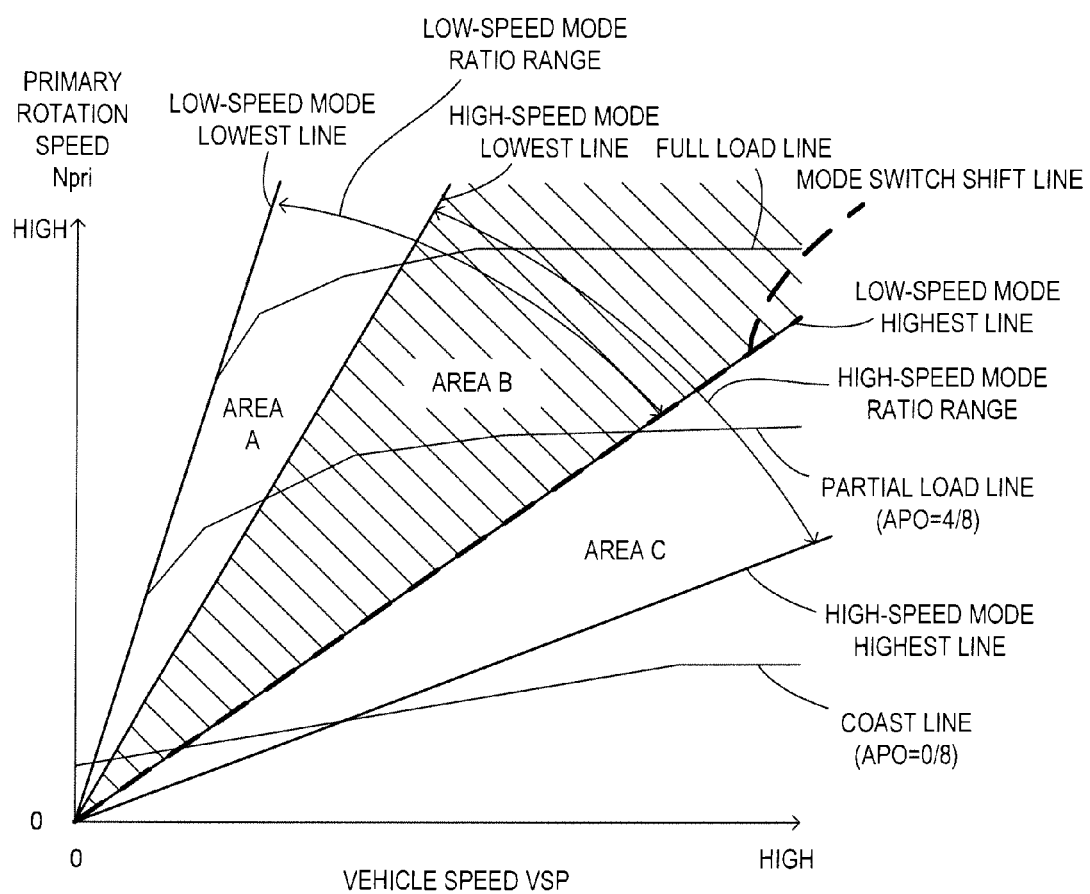
FIG. 3 is a graph showing an example of a shift map according to the embodiment of the present invention.

FIG. 3 shows an example of the shift map stored in the memory device 122 of the transmission controller 12.

On this shift map, an operating point of the transmission 4 is determined by the vehicle speed VSP and the primary rotation speed Npri. The inclination of a line connecting the operating point of the transmission 4 and a zero point at the lower left corner of the shift map indicates the speed ratio of the transmission 4 (overall speed ratio obtained by multiplying the speed ratio vRatio of the variator 20 by a speed ratio subRatio of the sub-transmission mechanism 30, hereinafter, referred to as a "through speed ratio Ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. For simplicity, only a whole load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by maximizing the speed ratio vRatio of the variator 20 and a low-speed mode highest line obtained by minimizing the speed ratio vRatio of the variator 20. At this time, the operating point of the transmission 4 moves in areas A and B. On the other hand, when being in the high-speed mode, the transmission 4 can be shifted between a high-speed mode lowest line obtained by maximizing the speed ratio vRatio of the variator 20 and a high-speed mode highest line obtained by minimizing the speed ratio vRatio of the variator 20. At this time, the operating point of the transmission 4 moves in areas B and C.

The speed ratio of each gear position of the sub-transmission mechanism 30 is so set that the speed ratio corresponding to the low-speed mode highest line (low-speed mode highest speed ratio, second speed ratio) is smaller than the speed ratio corresponding to the high-speed mode lowest line (high-speed mode lowest speed ratio, first speed ratio). By this, a low-speed ratio range which is a range of the through speed ratio Ratio of the transmission 4 that can be set in the low-speed mode and a high-speed mode ratio range which is a range of the through speed ratio Ratio of the transmission 4 that can be set in the high-speed mode partly overlap, and the transmission 4 can be selectively set in either one of the low-speed mode or the high-speed mode if the operating point of the transmission 4 is in the area B defined between the high-speed mode lowest line and the low-speed mode highest line.

The transmission controller 12 sets the through speed ratio Ratio corresponding to the vehicle speed VSP and the accelerator pedal opening APO (driving condition of the vehicle) as a final through speed ratio DRatio by referring to this shift map. This final through speed ratio DRatio is a target value which should be finally reached by the through speed ratio Ratio in this driving condition. Then, the transmission controller 12 sets a target through speed ratio tRatio which is a transient target value for causing the through speed ratio Ratio to follow the final through speed ratio DRatio with desired response characteristics, and controls the variator 20 and the sub-transmission mechanism 30 so that the through speed ratio Ratio coincides with the target through speed ratio tRatio.

On this shift map, a mode switch shift line (1-2 shift line of the sub-transmission mechanism 30) at which the sub-transmission mechanism 30 is shifted is so set as to overlap the low-speed mode highest line. A through speed ratio corresponding to the mode switch shift line (hereinafter, referred to as a "mode switch speed ratio mRatio") is equal to the low-speed mode highest speed ratio.

When the operating point of the transmission 4 crosses the mode switch shift line, i.e. the through speed ratio Ratio of the transmission 4 changes over the mode switch speed ratio mRatio, the transmission controller 12 executes a mode switch shift control. In the mode switch shift control, the transmission controller 12 shifts the sub-transmission mechanism 30 and performs a synchronization shift to change the speed ratio vRatio of the variator 20 in a direction opposite to a changing direction of the speed ratio subRatio of the sub-transmission mechanism 30.

In the synchronization shift, when the through speed ratio Ratio of the transmission 4 changes from a value larger than the mode switch speed ratio mRatio to a value smaller than that, the transmission controller 12 changes the gear position of the sub-transmission mechanism 30 from the first gear position to the second gear position (hereinafter, referred to as a "1-2 shift") and increases the speed ratio vRatio of the variator 20. Conversely, when the through speed ratio Ratio of the transmission 4 changes from a value smaller than the mode switch speed ratio mRatio to a value larger than that, the transmission controller 12 changes the gear position of the sub-transmission mechanism 30 from the second gear position to the first gear position (hereinafter, referred to as a "2-1 shift") and decreases the speed ratio vRatio of the variator 20.

The synchronization shift is performed at the time of a mode switch shift to suppress a sense of incongruity given to a driver as the input rotation changes due to a difference in the through speed ratio Ratio of the transmission 4. The mode switch shift is performed when the speed ratio vRatio of the variator 20 is the highest speed ratio because a torque input to the sub-transmission mechanism 30 is the smallest in this state under a torque input to the variator 20 at that time and a shift shock of the sub-transmission mechanism 30 can be alleviated if the sub-transmission mechanism 30 is shifted in this state.

According to the shift map, the speed ratio vRatio of the variator 20 is lowest and the sub-transmission mechanism 30 is in the first gear position when the vehicle stops.

Next, a manual mode shift is described.

The transmission 4 of this embodiment has a mode (manual mode) in which the transmission 4 can be fixed at a predetermined speed ratio by a driver's intention.

The transmission controller 12 includes a shift map (manual mode shift map) with a plurality of shift lines, at which the speed ratio is fixed at a predetermined speed ratio, beforehand. When a shift instruction is given from the driver, a control is executed to fix the speed ratio at the instructed shift line.

Figure 4:
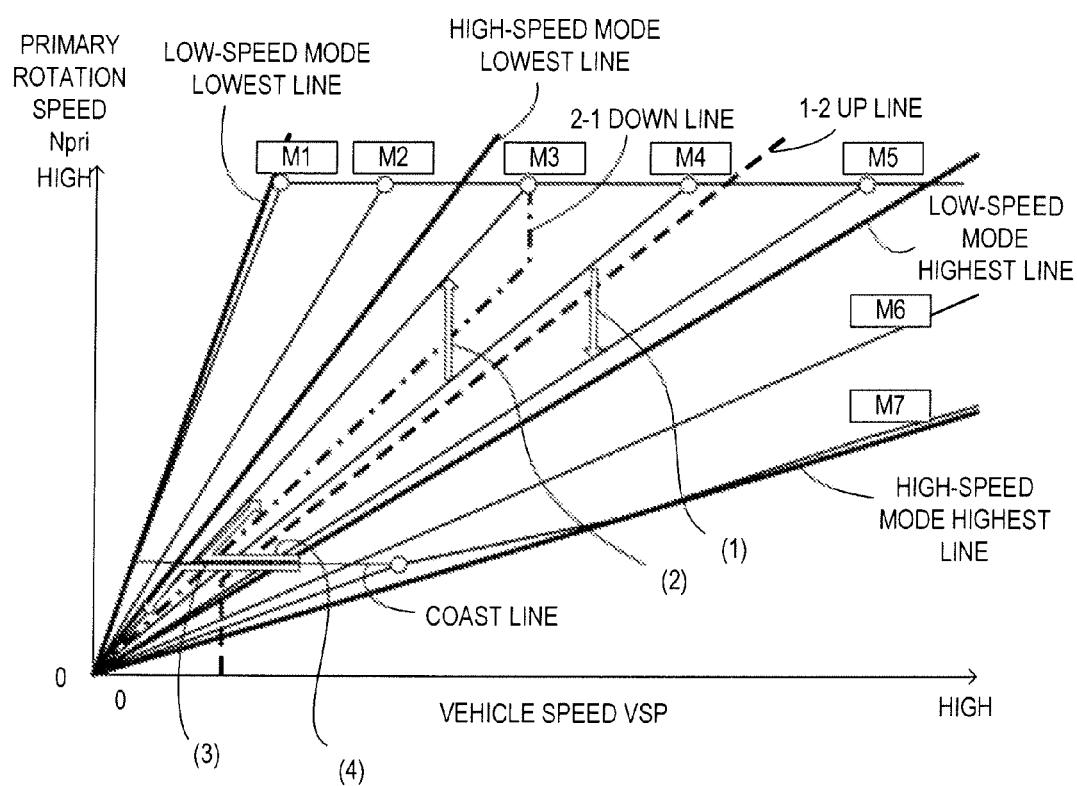
FIG. 4 is a graph showing an example of a manual mode shift map according to the embodiment of the present invention.

FIG. 4 is a diagram showing an example of the manual mode shift map of this embodiment.

An M1 shift line set to extend substantially along the low-speed mode lowest line, an M7 shift line set to extend substantially along the high-speed mode highest line, and M2 to M6 shift lines set between the M1 and M7 shift lines, i.e. shift lines representing a total of seven gear positions are set in the manual mode shift map shown in FIG. 4.

A driver instructs a transition to the manual mode by operating the select lever 45, the paddle 51 provided on the steering wheel 52 or the like when wishing a transition to the manual mode. In response to this, the transmission controller 12 changes the shift map from the normal shift map of FIG. 3 to the manual mode shift map of FIG. 4. In this way, the transition is made to the manual mode.

When the transition is made to the manual mode, the transmission controller 12 first changes a shift point to the manual mode shift line closest to the present shift point in the manual mode shift map. Alternatively, when the transition is made to the manual mode, the present shift point may be fixed and a shift may be performed along the shift line when a shift instruction is given from the driver.

If the driver instructs a desired gear position (M1 to M7) by operating the select lever 45 or the paddle 51 after the transition to the manual mode, the transmission controller 12 moves the shift point to a predetermined shift line of the manual mode shift map shown in FIG. 4 so that the speed ratio is fixed at the instructed gear position. In this way, a manual mode shift is realized.

Out of the manual mode shift lines, the M1 and M2 shift lines can be shifted only when the sub-transmission mechanism 30 is in the low-speed mode and the M6 and M7 shift lines can be shifted only when the sub-transmission mechanism 30 is in the high-speed mode. Further, the M3, M4 and M5 shift lines can be shifted regardless of whether the sub-transmission mechanism 30 is in a low mode or a high mode.

Accordingly, in the manual shift mode, the M1 and M2 gear positions can be shifted only when the sub-transmission mechanism is in the low mode. Further, the M6 and M7 gear positions can be shifted only when the sub-transmission mechanism is in the high mode. Thus, the transmission controller 12 shifts the speed ratio of the variator 20 for a shift between the M1 and M2 gear positions and for a shift between the M6 and M7 gear positions.

Further, the M3, M4 and M5 gear positions can be realized regardless of whether the sub-transmission mechanism 30 is in the low mode or the high mode. However, in the case of a shift from the M3 gear position to the M2 gear position when the sub-transmission mechanism 30 is in the high mode or in the case of a shift from the M5 gear position to the M6 gear position when the sub-transmission mechanism 30 is in the low mode, the transmission controller 12 needs to control the shift of the sub-transmission mechanism 30.

As shown in FIG. 4, a 1-2 UP line for shifting up the sub-transmission mechanism 30 from the low mode to the high mode is set in an area (area B) where the sub-transmission mechanism 30 can be shifted to either one of the low mode or the high mode. A 2-1 DOWN line for shifting down the sub-transmission mechanism 30 from the high mode to the low mode is similarly set.

The transmission controller 12 acquires the primary rotation speed Npri and the vehicle speed VSP in the normal shift map which is not the manual mode shift map, and shifts up the sub-transmission mechanism 30 from the low mode to the high mode when the shift point moves to a side where the vehicle speed is higher and the rotation speed is lower than the 1-2 UP line. Further, the transmission controller 12 shifts down the sub-transmission mechanism 30 from the high mode to the low mode when the shift point moves to a side where the vehicle speed is lower and the rotation speed is higher than the 2-1 DOWN line.

On the other hand, in the manual mode, some shifts between the respective shift lines can be achieved only by the shift of the variator 20 and the other shifts require the shift of the sub-transmission mechanism 30. The shift of the sub-transmission mechanism 30 has slower shift responsiveness and larger shift shock than the shift of only the variator 20. Thus, the shifts between the respective shift lines are preferably performed only by the variator 20. On the other hand, in the shift that requires the shift of the sub-transmission mechanism 30, the shift responsiveness differs and a sense of incongruity is given to the driver as compared with the shift only by the variator 20 if a synchronization shift as described above is performed.

Accordingly, in this embodiment, a control is executed to suppress a sense of incongruity given to the driver due to a delay in the responsiveness of the sub-transmission mechanism 30 during the shift in the manual mode as described below.

If up-shifting to the M5 gear position is performed in response to the driver's instruction (arrow (1) in FIG. 4) when the sub-transmission mechanism is in the low mode and the M4 gear position is selected in a state where the manual mode is selected, the transmission controller 12 judges a high possibility of a further transition to the M6 gear position in which the sub-transmission mechanism 30 needs to be shifted and shifts up the sub-transmission mechanism 30 when the gear position is shifted from M4 gear position to the M5 gear position.

If down-shifting to the M3 gear position is performed in response to an instruction from the driver (arrow (2) in FIG. 4) when the sub-transmission mechanism is in the high mode and the M4 gear position is selected in the state where the manual mode is selected, the transmission controller 12 judges a high possibility of a further transition to the M2 gear position in which the sub-transmission mechanism 30 needs to be shifted and shifts down the sub-transmission mechanism 30 when the gear position is shifted from the M4 gear position to the M3 gear position.

More specifically, if one further gear position of the gear position attained by a shift (up-shifting or down-shifting) instructed for the present gear position by the driver is invariably accompanied by the shift of the sub-transmission mechanism 30, in the manual mode, the transmission controller 12 shifts the sub-transmission mechanism 30 when the shift instruction is given from the driver.

The shift performed at this time is such that, in order to improve shift responsiveness, after the shift to the instructed gear position is completed by shifting the variator 20 to cause the through speed ratio Ratio to follow the target through speed ratio tRatio, a synchronization shift is performed by the variator 20 and the sub-transmission mechanism 30 so that the through speed ratio Ratio does not change.

By performing such a shift, the shift based on the driver's instruction can be performed with quick shift responsiveness by the shift of the variator 20 and then the sub-transmission mechanism 30 can be shifted beforehand prior to a state predicted to require the shift of the sub-transmission mechanism 30 when the operating point of the transmission is in the area B defined between the high-speed mode lowest line (first speed ratio) and the low-speed mode highest line (second speed ratio). Thus, even if the next shift instruction from the driver requires a speed ratio in the area A or C, a shift with quick shift responsiveness can be performed by the shift of only the variator 20 since the shift of the sub-transmission mechanism 30 is already completed.

In this embodiment, the shift of the sub-transmission mechanism 30 is also controlled in the following situation in the manual mode.

When the sub-transmission mechanism 30 is in the high mode and a coast down state is set in the state where the manual mode is selected, the transmission controller 12 does not shift the sub-transmission mechanism 30 until the vehicle stops (arrow (3) in FIG. 4) unless a shift instruction is given from the driver. The coast down is a driving condition in which deceleration is performed when the accelerator pedal opening APO is a predetermined value or below and indicates a driving condition in which the vehicle speed is gradually reduced along a coast line in FIG. 4.

In the normal shift map, the transmission controller 12 shifts down the sub-transmission mechanism 30 from the high mode to the low mode since the 2-1 DOWN line is crossed during the coast down.

On the other hand, in the manual mode, a shift shock occurs if the sub-transmission mechanism 30 is shifted during the coast down. That is, the driver develops a sense of incongruity due to a shift shock caused by a shift which is not based on the driver's intention to shift.

To prevent this, the transmission controller 12 prohibits down-shifting of the sub-transmission mechanism 30 in the coast down state. The vehicle decelerates along the coast line and further decelerates along the high-speed mode lowest line to stop. The transmission controller 12 shifts down the sub-transmission mechanism 30 from the high mode to the low mode after the vehicle stops.

In the coast down state, down-shifting of the sub-transmission mechanism is prohibited as described above. However, in the case of detecting an intention to accelerate by the driver in this state, the transmission controller 12 shifts down the sub-transmission mechanism 30 to the low mode (arrow (4) of FIG. 4).

Specifically, an intention to accelerate by the driver is determined when the accelerator pedal is operated by the driver during the coast down and the accelerator pedal opening APO is detected to be a predetermined opening or larger and, thereafter, a control is executed to shift the sub-transmission mechanism 30 to the low mode suitable for acceleration at a low speed side in consideration of a possibility of a further down-shifting instruction.

The transmission controller 12 shifts down the sub-transmission mechanism 30 from the high mode to the low mode in the case of detecting an intention to accelerate by the driver when the sub-transmission mechanism 30 is in the high mode and the coast down state is set.

Next, the operation of the transmission controller 12 in the manual mode is described.

Figure 5:
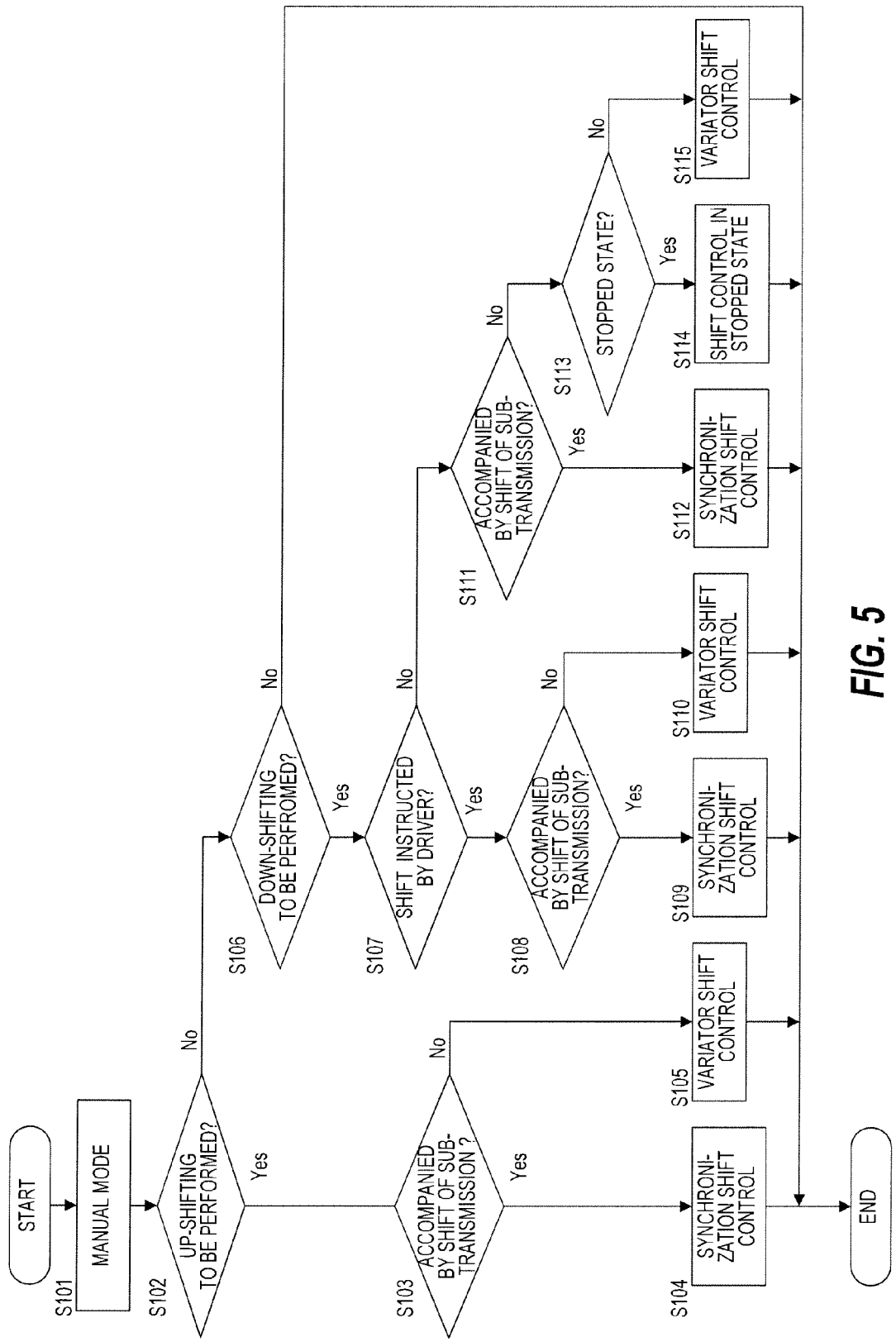
FIG. 5 is a flow chart of a control of a transmission controller according to the embodiment of the present invention.

FIG. 5 is a flow chart of the control of the transmission controller 12 according to this embodiment. A process of this flow chart is performed at every interval of a specified time (e.g. every 10 ms).

The transmission controller 12 starts the process of this flow chart (S101) when determining that the manual mode has been selected.

Subsequently, the transmission controller 12 determines whether or not up-shifting is to be performed based on an instruction from the driver or a state of the vehicle (S102). The process proceeds to Step S103 when it is determined that up-shifting is to be performed. The process proceeds to Step S106 when it is determined that up-shifting is not to be performed.

In Step S103, the transmission controller 12 determines whether or not up-shifting is accompanied by the shift of the sub-transmission mechanism 30. This determination is made to determine whether or not one further gear position of the gear position attained by up-shifting instructed for the present gear position by the driver is invariably accompanied by the shift of the sub-transmission mechanism 30, in the state where the sub-transmission mechanism 30 is in the low mode as described above.

When it is determined that the shift is accompanied by the shift of the sub-transmission mechanism 30, the process proceeds to Step S104 and the transmission controller 12 performs a synchronization shift in up-shifting by the variator 20 and the sub-transmission mechanism 30. The synchronization shift in up-shifting is described in detail later with reference to FIG. 6.

When it is determined that the shift is not accompanied by the shift of the sub-transmission mechanism 30, the process proceeds to Step S105 and the transmission controller 12 shifts the variator 20. More specifically, the transmission controller 12 shifts the variator 20 such that the through speed ratio Ratio follows the target through speed ratio tRatio set based on the final through speed ratio DRatio.

After the processings in Steps S104 and S105, the process by this flow chart is temporarily stopped.

When it is determined in Step S102 that up-shifting is not to be performed, the process proceeds to Step S106 and the transmission controller 12 determines whether or not down-shifting is to be performed based on the instruction from the driver or the state of the vehicle (S106). The process proceeds to Step S107 when it is determined that down-shifting is to be performed.

When it is determined in Step S106 that down-shifting is not to be performed, the process of this flow chart is ended without performing any shifting process since neither up-shifting nor down-shifting is to be performed, i.e. no shift is to be performed.

In Step S107, the transmission controller 12 determines whether or not down-shifting determined in Step S106 is the shift instructed by the driver. To determine whether or not the shift has been instructed by the driver, the transmission controller 12 determines whether or not the select lever 45 or the paddle 51 has been operated by the driver.

The process proceeds to Step S108 when it is determined that the shift has been instructed by the driver. The process proceeds to Step S111 when it is determined that down-shifting is not based on the instruction from the driver. Down-shifting that is not based on the instruction from the driver is based on such a driving condition of the vehicle in which deceleration is performed along the coast line and the manual mode shift line is crossed on the coast line.

In Step S108, the transmission controller 12 determines whether or not down-shifting is accompanied by the shift of the sub-transmission mechanism 30. This determination is made to determine whether or not one further gear position of the gear position attained by down-shifting instructed for the present gear position by the driver is invariably accompanied by the shift of the sub-transmission mechanism 30, in the state where the sub-transmission mechanism 30 is in the high mode as described above.

When it is determined that the shift is accompanied by the shift of the sub-transmission mechanism 30, the process proceeds to Step S109 and the transmission controller 12 performs a synchronization shift in down-shifting by the variator 20 and the sub-transmission mechanism 30. The synchronization shift in down-shifting is described in detail later with reference to FIG. 7.

When it is determined that the shift is not accompanied by the shift of the sub-transmission mechanism 30, the process proceeds to Step S110 and the transmission controller 12 shifts the variator 20. More specifically, the transmission controller 12 shifts the variator 20 such that the through speed ratio Ratio follows the target through speed ratio tRatio set based on the final through speed ratio DRatio.

After the processings in Steps S109 and S110, the process by this flow chart is temporarily stopped.

When it is determined in Step S107 that down-shifting is not based on the shift instruction from the driver, it is determined in Step S111 whether or not down-shifting is accompanied by the shift of the sub-transmission mechanism 30.

As described above, in the manual mode, the sub-transmission mechanism is not shifted down when the sub-transmission mechanism 30 is in the high mode and the coast down state is set (arrow (3) of FIG. 4). On the other hand, the transmission controller 12 performs down-shifting accompanied by the shift of the sub-transmission mechanism 30 (arrow (4) of FIG. 4) when determining an intention to accelerate such as depression of the accelerator pedal by the driver during this coast down.

When it is determined that down-shifting is accompanied by the shift of the sub-transmission mechanism 30, the process proceeds to Step S112 to perform a synchronization shift in down-shifting by the variator 20 and the sub-transmission mechanism 30. The synchronization shift in down-shifting is described in detail later with reference to FIG. 8.

When it is determined in Step S111 that down-shifting is not accompanied by the shift of the sub-transmission mechanism 30, the process proceeds to Step S113 to determine whether or not the vehicle is in a stopped state. When it is determined that the vehicle is in the stopped state, the process proceeds to Step S114 to perform a shift control in the stopped state.

Specifically, the transmission controller 12 shifts the sub-transmission mechanism to the low mode in the stopped state of the vehicle if the vehicle has been stopped with the sub-transmission mechanism 30 kept in the high mode. Further, if necessary, the variator 20 is shifted to the lowest speed ratio.

When it is determined in Step S113 that the vehicle is not in the stopped state, the process proceeds to Step S115 to shift the variator 20. More specifically, the transmission controller 12 shifts the variator 20 such that the through speed ratio Ratio follows the target through speed ratio tRatio set based on the final through speed ratio DRatio.

By the above process, the shift control in the manual mode is executed by the transmission controller 12.

Figure 6:
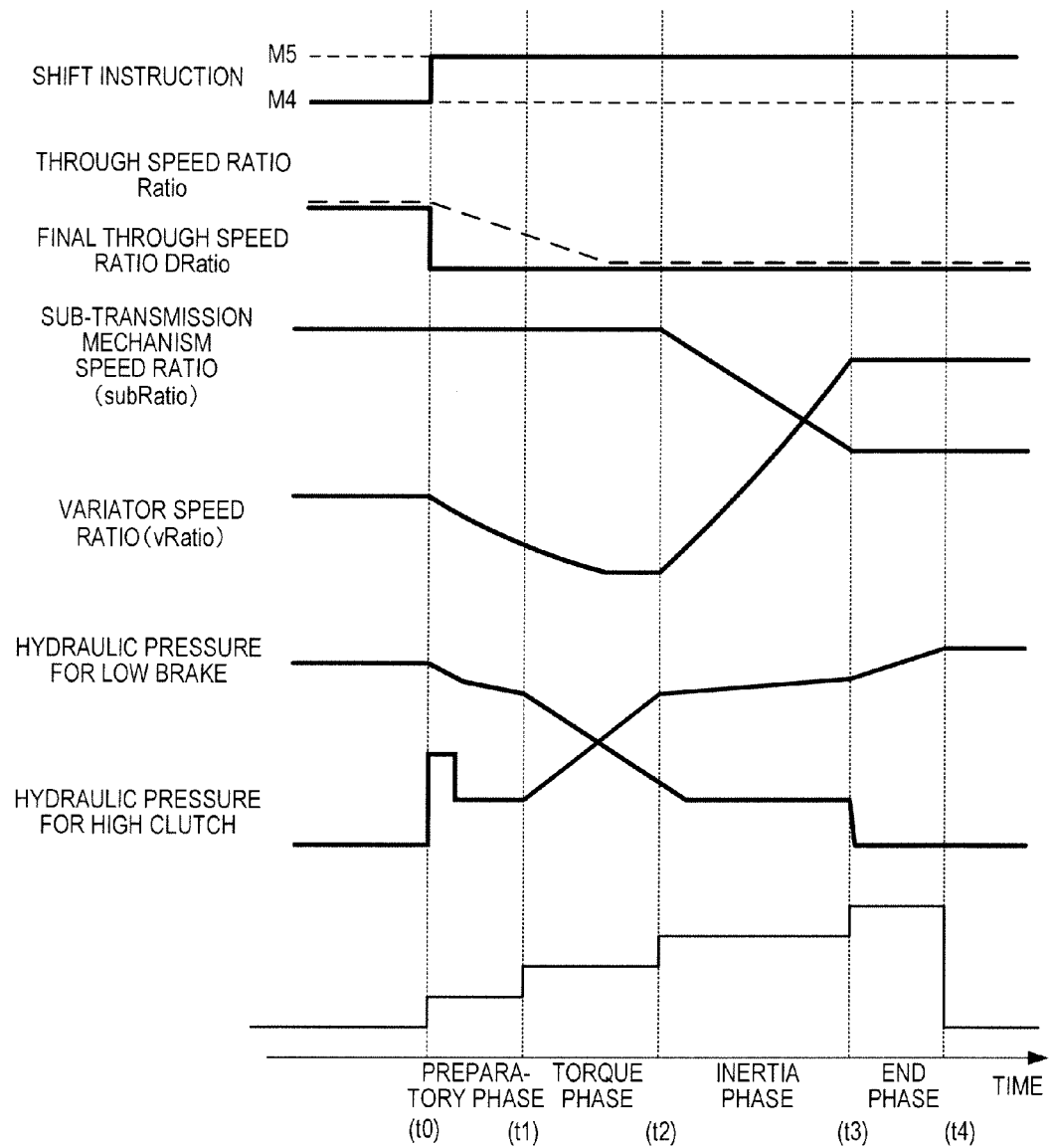
FIG. 6 is a time chart of a synchronization shift in upshifting in a manual mode according to the embodiment of the present invention.

FIG. 6 is a time chart of the synchronization shift in up-shifting by the variator 20 and the sub-transmission mechanism 30 in the manual mode according to this embodiment.

If one further gear position of the gear position attained by up-shifting instructed for the present gear position by the driver is invariably accompanied by the shift of the sub-transmission mechanism 30, in the manual mode (arrow (1) of FIG. 4), the transmission controller 12 shifts the sub-transmission mechanism 30 when the shift instruction is given from the driver.

In the shift at this time, the variator 20 is first shifted to improve shift responsiveness. The transmission controller 12 completes the shift to the instructed gear position by shifting the variator 20 so that the through speed ratio Ratio follows the target through speed ratio tRatio set based on the final through speed ratio DRatio corresponding to the instructed gear position. Thereafter, the synchronization shift is performed by the variator 20 and the sub-transmission mechanism 30 so that the through speed ratio Ratio does not change.

First, when the shift instruction is given from the driver (timing t0), the transmission controller 12 determines the target through speed ratio tRatio from the final through speed ratio DRatio corresponding to the gear position in the manual mode shift map based on the instruction from the driver. Then, the speed ratio of the variator 20 is so changed that the through speed ratio Ratio follows the target through speed ratio tRatio.

At this time, the transmission controller 12 prepares for the shift of the sub-transmission mechanism 30 at the same time as the shift of the variator 20 is started.

Specifically, a transition is made to a preparatory phase to prepare for the engagement of the high clutch 33 and the release of the low brake 32 (timing t0).

In the preparatory phase, the transmission controller 12 performs pre-charging to suppress a hydraulic pressure response delay by temporarily increasing the hydraulic pressure for the high clutch 33 as a clutch to be engaged and, then, sets the hydraulic pressure to a torque transmission starting hydraulic pressure and waits on standby. The transmission controller 12 also sets the hydraulic pressure for the low brake 32 to be released at a predetermined hydraulic pressure and waits on standby.

Subsequently, a transition is made to a torque phase in which a torque is switched between the high clutch 33 to be engaged and the low brake 32 to be released (timing t1). In the torque phase, the hydraulic pressure is adjusted to transmit a torque output from the engine 1 from the low brake to be released to the high clutch to be engaged in the sub-transmission mechanism 30.

The shift of the variator 20 is completed during the torque phase due to the shift responsiveness of the variator 20.

Subsequently, a transition is made to an inertia phase in which the sub-transmission mechanism 30 and the variator 20 are shifted (timing t2). In the inertia phase in up-shifting, the transmission controller 12 performs such a synchronization shift by the sub-transmission mechanism 30 and the variator 20 that the speed ratio of the variator 20 is increased at the same time as the sub-transmission mechanism 30 is shifted up from the first gear position to the second gear position. At this time, since an input torque to the sub-transmission mechanism 30 is increased by an increased rate of the speed ratio of the variator 20, the transmission controller 12 executes a control to increase the hydraulic pressure for the high clutch 33 to be engaged according to an increase in the input torque to the sub-transmission mechanism 30 accompanying the shift of the variator 20. Further, the hydraulic pressure for the low brake 32 to be released is not completely drained in preparation for a torque variation during the shift and kept at such a hydraulic pressure that a torque transmission capacity of the low brake 32 is 0.

In this way, the low brake 32 is gradually released and the high clutch 33 is gradually engaged, whereby the sub-transmission mechanism 30 is gradually shifted from the first gear position to the second gear position.

While the sub-transmission mechanism 30 is being shifted, the transmission controller 12 gradually shifts the speed ratio of the variator 20 in a direction opposite to a direction in which the speed ratio of the sub-transmission mechanism 30 is changed.

Specifically, the transmission controller 12 continuously increases the speed ratio vRatio of the variator 20 by adjusting the hydraulic pressures supplied to the hydraulic cylinders 23a, 23b to change the widths of the V-grooves of the respective pulleys 21, 22.

In this way, the synchronization shift is so performed that the speed ratio of the sub-transmission mechanism 30 and that of the variator 20 are changed in opposite directions while a change of the through speed ratio Ratio is suppressed.

After the shift from the first gear position to the second gear position is completed in the sub-transmission mechanism 30, a transition is made to an end phase (timing t3).

In the end phase, the transmission controller 12 causes the high clutch 33 to be completely engaged by increasing the hydraulic pressure for the high clutch 33 to be engaged to a predetermined hydraulic pressure. The hydraulic pressure for the low brake 32 to be released is drained to completely release the low brake 32. In this way, the shift of the sub-transmission mechanism 30 is completed (timing t4).

By the above process, the synchronization shift in up-shifting by the variator 20 and the sub-transmission mechanism 30 is finished.

Figure 7:
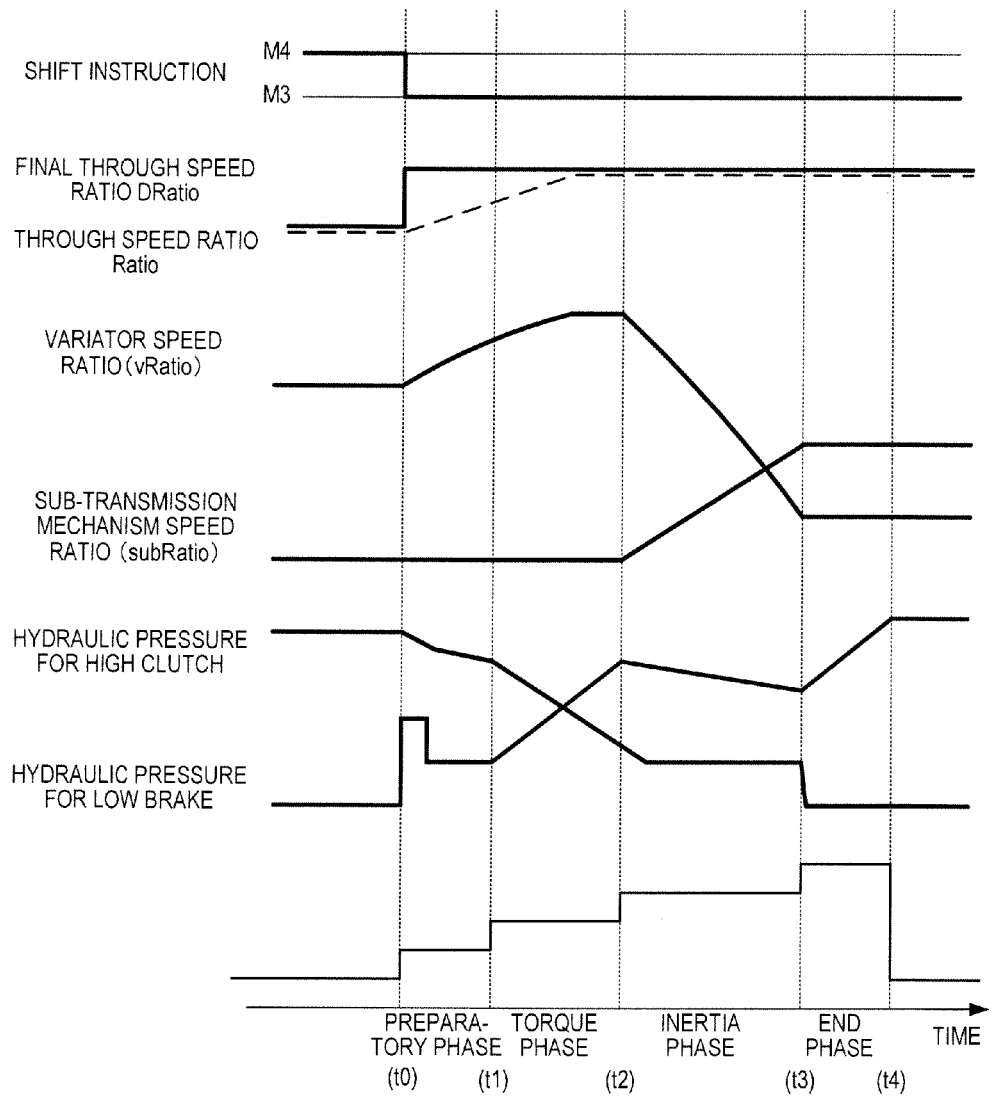
FIG. 7 is a time chart of a synchronization shift in downshifting in the manual mode according to the embodiment of the present invention.

FIG. 7 is a time chart of the synchronization shift in down-shifting by the variator 20 and the sub-transmission mechanism 30 in the manual mode according to this embodiment.

If one further gear position of the gear position attained by down-shifting instructed for the present gear position by the driver is invariably accompanied by the shift of the sub-transmission mechanism 30, in the manual mode (arrow (2) of FIG. 4), the transmission controller 12 shifts the sub-transmission mechanism 30 when the shift instruction is given from the driver.

First, when the shift instruction is given from the driver (timing t0), the transmission controller 12 determines the target through speed ratio tRatio from the final through speed ratio DRatio corresponding to the gear position in the manual mode shift map based on the instruction from the driver and changes the speed ratio of the variator 20 so that the through speed ratio Ratio follows the target through speed ratio tRatio.

At this time, similar to the above synchronization shift in up-shifting of FIG. 6, the transmission controller 12 transitions to a preparatory phase to start preparation for the shift of the sub-transmission mechanism 30 at the same time as the shift of the variator 20 is started in response to the shift instruction from the driver. In the preparatory phase, the engagement of the low brake 32 and the release of the high clutch 33 are prepared.

Subsequently, a transition is made to a torque phase in which a torque is switched between the low brake 32 to be engaged and the high clutch 33 to be released (timing t1).

The follow-up of the through speed ratio Ratio to the target through speed ratio tRatio by the variator 20 is completed during the torque phase.

Subsequently, a transition is made to an inertia phase in which the sub-transmission mechanism 30 and the variator 20 are shifted (timing t2). In the inertia phase in down-shifting, the transmission controller 12 performs such a synchronization shift by the sub-transmission mechanism 30 and the variator 20 that the speed ratio of the variator 20 is decreased at the same time as the sub-transmission mechanism 30 is shifted down from the second gear position to the first gear position. At this time, since an input torque to the sub-transmission mechanism 30 is decreased by a decreased rate of the speed ratio of the variator 20, the transmission controller 12 executes a control to decrease the hydraulic pressure for the low brake 32 to be engaged according to a decrease in the input torque to the sub-transmission mechanism 30 accompanying the shift of the variator 20. Further, the hydraulic pressure for the high clutch 33 to be released is not completely drained in preparation for a torque variation during the shift and kept at such a hydraulic pressure that a torque transmission capacity of the high clutch 33 is 0.

In this way, the high clutch 33 is gradually released and the low brake 32 is gradually engaged, whereby the sub-transmission mechanism 30 is gradually shifted from the second gear position to the first gear position.

While the sub-transmission mechanism 30 is being shifted, the transmission controller 12 gradually shifts the speed ratio of the variator 20 in a direction opposite to a direction in which the speed ratio of the sub-transmission mechanism 30 is changed.

In this way, the synchronization shift is so performed that the speed ratio of the sub-transmission mechanism 30 and that of the variator 20 are changed in opposite directions while a change of the through speed ratio Ratio is suppressed.

After the shift from the second gear position to the first gear position is completed in the sub-transmission mechanism 30, a transition is made to an end phase (timing t3).

In the end phase, the transmission controller 12 causes the low brake 32 to be completely engaged by increasing the hydraulic pressure for the low brake 32 to be engaged to a predetermined hydraulic pressure. The hydraulic pressure for the high clutch 33 to be released is drained to completely release the high clutch 33. In this way, the shift of the sub-transmission mechanism 30 is completed (timing t4).

By the above process, the synchronization shift in down-shifting by the variator 20 and the sub-transmission mechanism 30 is finished.

In this way, the transmission controller 12 executes a control as shown in FIG. 6 or 7 at the time of down-shifting or up-shifting, whereby a shift to the gear position instructed by the driver can be performed with the shift responsiveness of the variator 20. Further, since the shift of the sub-transmission mechanism 30 is already completed for a predicted shift accompanied by the shift of the sub-transmission mechanism 30, the shift can be performed with the shift responsiveness of the variator 20 also in response to the next shift instruction. Although the torque varies (shift shock) during the shift of the sub-transmission mechanism 30, it occurs as a result of the shift instruction from the driver and, hence, a sense of incongruity is not given to the driver.

Figure 8:
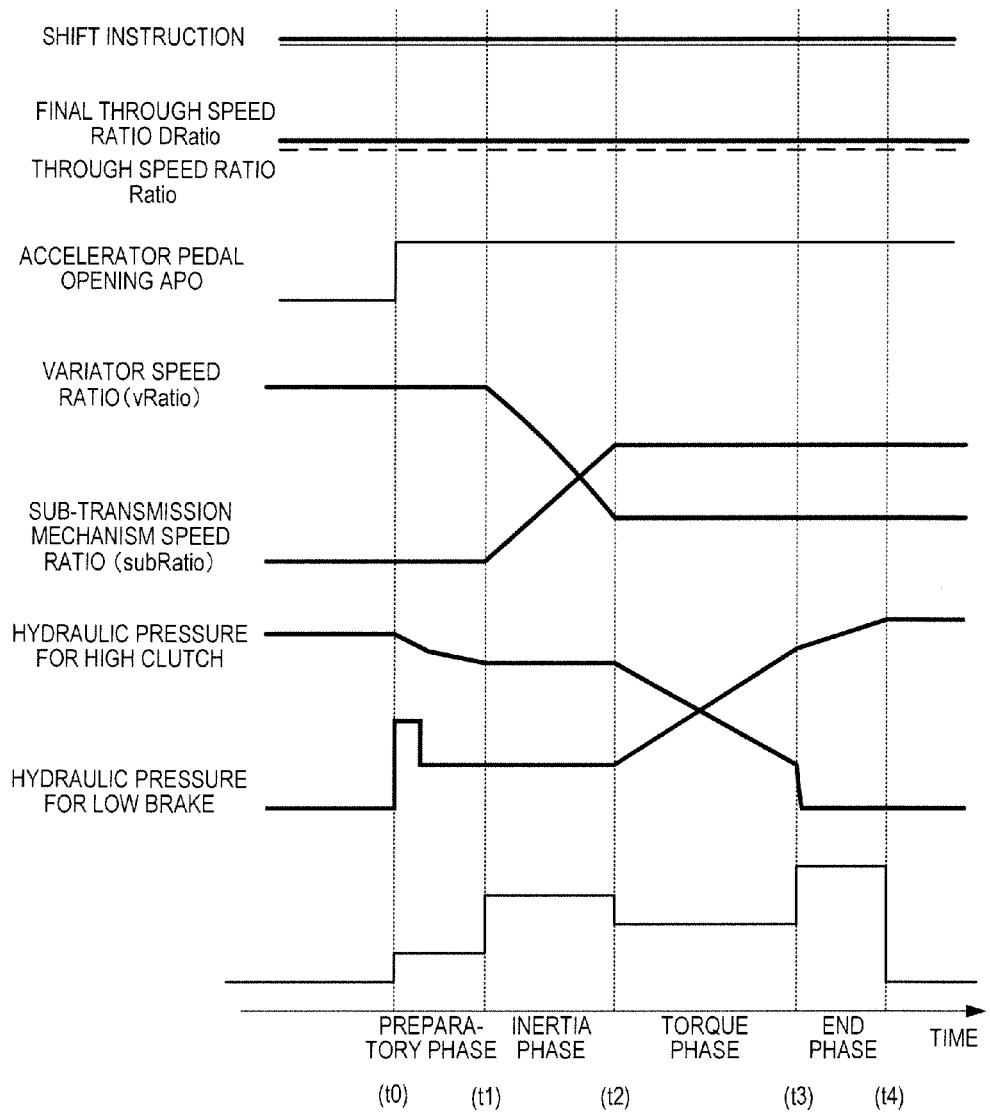
FIG. 8 is a time chart of a synchronization shift in downshifting in the manual mode according to the embodiment of the present invention.

FIG. 8 is a time chart of the synchronization shift in down-shifting by the variator 20 and the sub-transmission mechanism 30 in the manual mode according to this embodiment.

If an intention to accelerate by the driver is detected when the sub-transmission mechanism 30 is in the high mode and the coast down state is set in the state where the manual mode is selected (arrow (4) of FIG. 4), the transmission controller 12 shifts down the sub-transmission mechanism 30 to the low mode.

If there is an intention to accelerate from the driver when the sub-transmission mechanism 30 is in the high mode and the coast down state is set, more specifically if the accelerator pedal opening APO exceeds a predetermined opening (timing t0), the transmission controller 12 predicts an instruction to shift to a lower gear position and shifts down the sub-transmission mechanism 30 from the second gear position to the first gear position beforehand.

First, the transmission controller 12 transitions to a preparatory phase to prepare for the shift of the sub-transmission mechanism 30. In the preparatory phase, the engagement of the low brake 32 and the release of the high clutch 33 are prepared.

Subsequently, a transition is made to an inertia phase in which the sub-transmission mechanism 30 and the variator 20 are shifted (timing t1).

In the case of shifting down the sub-transmission mechanism 30 when the accelerator pedal opening APO is equal to or larger than a predetermined opening, a magnitude relationship of the torque among the engine, the transmission and the axle is reversed from that in the above transmission controls of FIGS. 6 and 7. Thus, a transition is made to a torque phase to change the engaged states of the respective frictional engagement elements after the transition is first made to the inertia phase to change the speed ratio of the sub-transmission mechanism 30.

In the inertia phase, the transmission controller 12 causes the low brake 32 to be engaged by gradually increasing the hydraulic pressure for the low brake 32 to be engaged. At this time, the hydraulic pressure for the high clutch 33 to be released is kept at a predetermined hydraulic pressure determined in the preparatory phase.

Subsequently, a transition is made to a torque phase to switch the torque between the low brake 32 to be engaged and the high clutch 33 to be released (timing t2).

In this way, the high clutch 33 is gradually released and the low brake 32 is gradually engaged, whereby the sub-transmission mechanism 30 is gradually shifted from the second gear position to the first gear position.

While the sub-transmission mechanism 30 is being shifted, the transmission controller 12 gradually shifts the speed ratio of the variator 20 in a direction opposite to a direction in which the speed ratio of the sub-transmission mechanism 30 is changed.

In this way, the synchronization shift is so performed that the speed ratio of the sub-transmission mechanism 30 and that of the variator 20 are changed in opposite directions while a change of the through speed ratio Ratio is suppressed.

After the shift from the second gear position to the first gear position is completed in the sub-transmission mechanism 30, a transition is made to an end phase (timing t3).

In the end phase, the transmission controller 12 causes the low brake 32 to be completely engaged by increasing the hydraulic pressure for the low brake 32 to be engaged to a predetermined hydraulic pressure. The hydraulic pressure for the high clutch 33 to be released is drained to completely release the high clutch 33. In this way, the shift of the sub-transmission mechanism 30 is completed (timing t4).

By the above process, the synchronization shift in down-shifting by the variator 20 and the sub-transmission mechanism 30 is finished.

In this way, the transmission controller 12 executes a control as shown in FIG. 8 when there is an intention to accelerate in the coast down state, whereby the shift of the sub-transmission mechanism 30 is already completed for a predicted shift to a down-side shift line. Thus, a shifted state in accordance with the intention to accelerate by the driver can be set.

Although the torque varies (shift shock) during the shift of the sub-transmission mechanism 30, it occurs as a result of the driver's intention to accelerate and, hence, not only a sense of incongruity is not given to the driver, but also a sense of acceleration can be given to the driver by the occurrence of the torque variation, wherefore driving can be made more interesting.

As described above, according to the embodiment of the present invention, it can be prevented to give a sense of incongruity to a driver due to a difference in shift responsiveness in a so-called manual mode shift, in which a plurality of gear positions set beforehand are set in response to a shift instruction from the driver, in the continuously variable transmission that includes the continuously variable transmission mechanism (variator) 20 and the sub-transmission mechanism 30 having a plurality of gear positions and can enlarge the shift area.

More specifically, in a situation where a shift instruction from the driver is predicted to be accompanied by the shift of the sub-transmission mechanism 30, the sub-transmission mechanism 30 is shifted after the through speed ratio Ratio corresponding to the shift instruction is realized only by the variator 20. By doing so, the shift to the gear position instructed from the driver can be performed with the shift responsiveness of the variator 20. Further, since the shift of the sub-transmission mechanism 30 is already completed beforehand for a predicted shift accompanied by the shift of the sub-transmission mechanism 30, the shift can be performed with the shift responsiveness of the variator 20 also in response to the next shift instruction.

By such a control, it can be prevented that a sense of incongruity is given to the driver due to a difference between the shift responsiveness of the variator 20 and that of the sub-transmission mechanism 30.

When the sub-transmission mechanism 30 is in the high mode and the coast down state is set in the state where the manual mode is selected, the transmission controller 12 does not shift the sub-transmission mechanism 30 until the vehicle stops unless a shift instruction is given from the driver. This prevents the occurrence of a shift shock independent of a shift instruction from the driver and prevents a sense of incongruity from being given to the driver.

When an intention to accelerate by the driver is detected in the coast down state, the transmission controller 12 can prepare the transmission for a state corresponding to the intention to accelerate by shifting down the sub-transmission mechanism 30 to the low mode and can make the driving more interesting by causing a torque variation to give a sense of acceleration to the driver.

In the case of shifting the sub-transmission mechanism 30, the sub-transmission mechanism 30 transitions to the preparatory phase at the same time as the shift of the variator 20 is started when a shift instruction is given from the driver. It takes time for the sub-transmission mechanism 30 to enter the inertia phase in which a change in the transmission is actually started via the preparatory phase and the torque phase, but the follow-up to the final through speed ratio DRatio by the variator 20 is completed during this time. Thus, time until the sub-transmission mechanism 30 starts performing the synchronization shift is efficiently used.

The embodiment of the present invention has been described above. The above embodiment is merely illustration of one application example of the present invention and not of the nature to limit the technical scope of the present invention to the specific construction of the above embodiment.

For example, the V-belt continuously variable transmission mechanism is provided as the variator 20 in the above embodiment, but the variator 20 may be a continuously variable transmission mechanism in which a chain is wrapped around the pulleys 21 and 22 instead of the V-belt 23. Alternatively, the variator 20 may be a toroidal continuously variable transmission mechanism in which inclinable power rollers are arranged between an input disk and an output disk.

Although the sub-transmission mechanism 30 is a transmission mechanism with two forward gear positions, i.e. the first and second gear positions in the above embodiment, it may be a transmission mechanism with three or more forward gear positions.

Although the sub-transmission mechanism 30 is constructed using the Ravigneaux-type planetary gear mechanism, it is not limited to such a construction. For example, the sub-transmission mechanism 30 may be constructed by combining a normal planetary gear mechanism and frictional engagement elements or may be constructed by a plurality of power transmission paths including a plurality of gear trains with different gear ratios and frictional engagement elements for switching these power transmission paths.

Although the hydraulic cylinders 23a, 23b are provided as actuators for displacing the movable conical plates of the pulleys 21, 22 in the axial directions, the actuators are not limited to hydraulically driven ones and may be electrically driven.

This application claims priority based on Japanese Patent Application No. 2010-201167, filed with the Japan Patent Office on Sep. 8, 2010, the entire content of which is incorporated into this specification by reference.

What is claimed is:

1. A continuously variable transmission installed in a vehicle to shift and transmit output rotation of a driving source, comprising:
   a variator which changes a speed ratio continuously;
   a sub-transmission mechanism provided in series with the variator and having a first gear position at a low speed side and a second gear position at a high speed side; and
   a transmission controller configured to:
      set a final through speed ratio as a target speed ratio based on a driving condition of the vehicle,
      cause a through speed ratio, which is an overall speed ratio of the variator and the sub-transmission mechanism, to follow the final through speed ratio in a specified response by changing at least one of the speed ratio of the variator and a gear position of the sub-transmission mechanism,
      select a manual mode in which a plurality of gear positions are set beforehand and a speed ratio corresponding to any one of the plurality of gear positions is set as the final through speed ratio based on a shift instruction from a driver, and
      shift the sub-transmission mechanism while changing the speed ratio of the variator in response to a change in the speed ratio of the sub-transmission mechanism such that the through speed ratio does not change after the through speed ratio is caused to reach the final through speed ratio by changing only the speed ratio of the variator if the speed ratio corresponding to the shift instruction from the driver is smaller than a first speed ratio at which the sub-transmission mechanism is in the second gear position at the high speed side and the speed ratio of the variator is lowest and larger than a second speed ratio at which the sub-transmission mechanism is in the first gear position at the low speed side and the speed ratio of the variator is highest when the manual mode is selected.

2. The continuously variable transmission according to claim 1, wherein the transmission controller is configured to shift the sub-transmission mechanism while changing the speed ratio of the variator in response to the change in the speed ratio of the sub-transmission mechanism such that the through speed ratio follows the final through speed ratio in a case of detecting an intention of the driver to accelerate when the manual mode is selected.

3. The continuously variable transmission according to claim 2, wherein the transmission controller is configured to shift the sub-transmission mechanism from the second gear position at the high speed side to the first gear position at the low speed side while changing the speed ratio of the variator in response to the change in the speed ratio of the sub-transmission mechanism such that the through speed ratio follows the final through speed ratio if the intention of the driver to accelerate is detected when the vehicle is being decelerated, the manual mode is selected, and the speed ratio of the sub-transmission mechanism is that in the second gear position at the high speed side.

4. The continuously variable transmission according to claim 1, wherein the transmission controller is configured to start shifting the variator, start a shift preparation of a hydraulic mechanism for shifting the sub-transmission mechanism, and change the speed ratio of the sub-transmission mechanism after a follow-up to the final through speed ratio by shifting of the variator if the shift instruction is given from the driver when the manual mode is selected.

5. A shift control method for a continuously variable transmission which includes a variator which changes a speed ratio continuously and a stepped sub-transmission mechanism provided in series with the variator and is installed to shift and transmit output rotation of a driving source in a vehicle having a transmission controller, the shift control method comprising:
   setting, by the transmission controller, a final through speed ratio as a target speed ratio based on a driving condition of the vehicle;
   causing, by the transmission controller, a through speed ratio, which is an overall speed ratio of the variator and the sub-transmission mechanism, to follow the final through speed ratio in a specified response by changing at least one of the speed ratio of the variator and a gear position of the sub-transmission mechanism;
   causing, by the transmission controller, the through speed ratio to follow the final through speed ratio by changing only the speed ratio of the variator if a speed ratio corresponding to a shift instruction from a driver is smaller than a first speed ratio at which the sub-transmission mechanism is in a second gear position at a high speed side and the speed ratio of the variator is lowest and larger than a second speed ratio at which the sub-transmission mechanism is in a first gear position at a low speed side and the speed ratio of the variator is highest when a manual mode is selected in which a plurality of gear positions are set beforehand and a speed ratio corresponding to any one of the plurality of gear positions is set as the final through speed ratio based on the shift instruction from the driver, and
   thereafter shifting, by the transmission controller, the sub-transmission mechanism while the speed ratio of the variator is changed in response to a change in a speed ratio of the sub-transmission mechanism such that the through speed ratio does not change.

6. The shift control method according to claim 5, wherein the sub-transmission mechanism is shifted by the transmission controller while the transmission controller changes the speed ratio of the variator in response to the change in the speed ratio of the sub-transmission mechanism such that the through speed ratio follows the final through speed ratio in a case of detecting an intention of the driver to accelerate when the manual mode is selected.

7. The shift control method according to claim 6, wherein the sub-transmission mechanism is shifted by the transmission controller from the second gear position at the high speed side to the first gear position at the low speed side while the transmission controller changes the speed ratio of the variator in response to the change in the speed ratio of the sub-transmission mechanism such that the through speed ratio follows the final through speed ratio if the intention of the driver to accelerate is detected when the vehicle is being decelerated, the manual mode is selected, and the speed ratio of the sub-transmission mechanism is that in the second gear position at the high speed side.

8. The shift control method according to claim 5, wherein:
   shifting the variator is started by the transmission controller,
   a shift preparation of a hydraulic mechanism for shifting the sub-transmission mechanism is started by the transmission controller, and
   the speed ratio of the sub-transmission mechanism is changed by the transmission controller after a follow-up to the final through speed ratio by shifting of the variator if the shift instruction is given from the driver when the manual mode is selected.

9. A continuously variable transmission installed in a vehicle to shift and transmit output rotation of a driving source, comprising:
   variator which changes a speed ratio continuously;
   a sub-transmission mechanism provided in series with the variator and having a first gear position at a low speed side and a second gear position at a high speed side;
   means for setting a final through speed ratio as a target speed ratio based on a driving condition of the vehicle and for causing a through speed ratio, which is an overall speed ratio of the variator and the sub-transmission mechanism, to follow the final through speed ratio in a specified response by changing at least one of the speed ratio of the variator and a gear position of the sub-transmission mechanism,
   means for selecting a manual mode in which a plurality of gear positions are set beforehand and a speed ratio corresponding to any one of the plurality of gear positions is set as the final through speed ratio based on a shift instruction front a driver, and
   means for shifting the sub-transmission mechanism while changing the speed ratio of the variator in response to a change in a speed ratio of the sub-transmission mechanism such that the through speed ratio does not change after the through speed ratio is caused to reach the final through speed ratio by changing only the speed ratio of the variator if the speed ratio corresponding to the shift instruction from the driver is smaller than a first speed ratio at which the sub-transmission mechanism is in the second gear position at the high speed side and the speed ratio of the variator is lowest and larger than a second speed ratio at which the sub-transmission mechanism is in the first gear position at the low speed side and the speed ratio of the variator is highest when the manual mode is selected.

10. The continuously variable transmission according to claim 9, wherein the means for shifting shifts the sub-transmission mechanism while changing the speed ratio of the variator in response to the change in the speed ratio of the sub-transmission mechanism such that the through speed ratio follows the final through speed ratio in a case of detecting an intention of the driver to accelerate when the manual mode is selected.

11. The continuously variable transmission according to claim 10, wherein the means for shifting shifts the sub-transmission mechanism from the second gear position at the high speed side to the first gear position at the low speed side while changing the speed ratio of the variator in response to the change in the speed ratio of the sub-transmission mechanism so that the through speed ratio follows the final through speed ratio if the intention of the driver to accelerate is detected when the vehicle is being decelerated, the manual mode is selected, and the speed ratio of the sub-transmission mechanism is that in the second gear position at the high speed side.

12. The continuously variable transmission according to claim 9, wherein the means for shifting starts shifting the variator, starts a shift preparation of a hydraulic mechanism for shifting the sub-transmission mechanism, and changes the speed ratio of the sub-transmission mechanism after a follow-up to the final through speed ratio by a shift of the variator if the shift instruction is given from the driver when the manual mode is selected.

* * * * *